(12) United States Patent
Li et al.

(10) Patent No.: US 10,777,153 B1
(45) Date of Patent: Sep. 15, 2020

(54) METHOD FOR CALCULATING PIXEL VOLTAGE FOR LIQUID CRYSTAL ON SILICON DISPLAY DEVICE

(71) Applicant: Himax Display, Inc., Tainan (TW)

(72) Inventors: Yuet-Wing Li, Tainan (TW); Wen-Hsu Chen, Tainan (TW)

(73) Assignee: Himax Display, Inc., Tainan (TW)

( * ) Notice: Subject to any disclaimer, the term of this patent is extended or adjusted under 35 U.S.C. 154(b) by 0 days.

(21) Appl. No.: 16/413,616

(22) Filed: May 16, 2019

(51) Int. Cl.
*G02F 1/13* (2006.01)
*G09G 3/36* (2006.01)
*G02F 1/1362* (2006.01)

(52) U.S. Cl.
CPC ..... *G09G 3/3607* (2013.01); *G02F 1/136277* (2013.01); *G09G 3/3696* (2013.01); *G02F 2001/136222* (2013.01); *G02F 2201/121* (2013.01); *G02F 2201/123* (2013.01); *G02F 2203/30* (2013.01); *G09G 2320/0673* (2013.01)

(58) Field of Classification Search
CPC ......... G02F 1/133514; G02F 1/133553; G02F 1/1337; G02F 1/136277; G02F 2001/133302; G02F 2001/2001; G02F 2001/13613; G02F 2001/136222; G02F 2201/121; G02F 2201/123; G02F 2201/34; G02F 2202/104; G02F 2203/02; G02F 2203/30; G09G 3/2074; G09G 3/36; G09G 3/3607; G09G 3/3648; G09G 3/3696; G09G 2300/0408; G09G 2320/0209; G09G 2320/0673; G06F 3/013; G06F 3/147; G06F 3/0416; G06F 3/044; G06F 3/046; G06F 2203/04106; H01L 27/3213
See application file for complete search history.

(56) References Cited

U.S. PATENT DOCUMENTS

| | | | | |
|---|---|---|---|---|
| 5,644,373 A * | 7/1997 | Furushima | ............ | G02F 1/1333 349/158 |
| 5,886,365 A * | 3/1999 | Kouchi | ............... | G02F 1/13454 257/59 |
| 6,141,124 A * | 10/2000 | Suzuki | ................... | G02B 5/201 349/5 |
| 6,219,113 B1 * | 4/2001 | Takahara | ............... | G02F 1/1334 345/98 |
| 8,218,211 B2 * | 7/2012 | Kroll | ........................ | G03H 1/02 359/32 |

(Continued)

FOREIGN PATENT DOCUMENTS

| CN | 104240629 A | 12/2014 |
|---|---|---|
| CN | 106057120 A | 10/2016 |

(Continued)

*Primary Examiner* — Michael J Eurice
(74) *Attorney, Agent, or Firm* — CKC & Partners Co., LLC

(57) ABSTRACT

A liquid crystal on silicon display device is provided. Multiple grey levels of a pixel are transformed into multiple color values. The grey levels respectively correspond to multiple first sub-pixels. For each of the first sub-pixels, at least one parameter of a reflectance fitting function is obtained according to the color values, a gamma correction is performed according to the corresponding grey level to obtain a reflectance, and a pixel voltage is calculated according to the at least one parameter and the reflectance. The pixel voltage is applied to a pixel electrode of the corresponding first sub-pixel.

8 Claims, 6 Drawing Sheets

(2 of 6 Drawing Sheet(s) Filed in Color)

(56) References Cited

U.S. PATENT DOCUMENTS

| | | | | |
|---|---|---|---|---|
| 8,350,621 B2* | 1/2013 | Yamazaki | | H01L 29/78693 327/581 |
| 8,400,187 B2* | 3/2013 | Yamazaki | | H01L 27/1225 326/102 |
| 8,455,160 B2* | 6/2013 | Tu | | G02B 5/201 349/106 |
| 8,487,980 B2* | 7/2013 | Kroll | | G03H 1/268 348/40 |
| 8,884,651 B2* | 11/2014 | Yamazaki | | H01L 29/7869 326/81 |
| 2002/0063826 A1* | 5/2002 | Okamoto | | G02B 5/3083 349/117 |
| 2003/0057419 A1* | 3/2003 | Murakami | | H01L 29/458 257/72 |
| 2004/0206882 A1* | 10/2004 | Banks | | A61B 5/0059 250/201.2 |
| 2004/0233150 A1* | 11/2004 | Guttag | | G09G 5/10 345/87 |
| 2006/0023150 A1* | 2/2006 | Mochizuki | | G09G 3/3688 349/139 |
| 2007/0063938 A1* | 3/2007 | Kuan | | G09G 3/007 345/87 |
| 2007/0211005 A1* | 9/2007 | Tsai | | G09G 3/3696 345/89 |
| 2007/0222481 A1* | 9/2007 | Ishii | | G09G 3/3688 327/12 |
| 2007/0236640 A1* | 10/2007 | Kimura | | G02F 1/133514 349/141 |
| 2008/0129905 A1* | 6/2008 | Watanabe | | G09G 3/3648 349/37 |
| 2008/0136990 A1* | 6/2008 | Kimura | | H01L 27/1218 349/46 |
| 2008/0238850 A1* | 10/2008 | Watanabe | | G09G 3/3659 345/90 |
| 2010/0014120 A1* | 1/2010 | Nishiyama | | H04N 1/54 358/3.01 |
| 2010/0053512 A1* | 3/2010 | Taniguchi | | G02F 1/133514 349/106 |
| 2012/0154370 A1* | 6/2012 | Russell | | G09G 3/346 345/214 |
| 2015/0002528 A1* | 1/2015 | Bohn | | G02B 27/0172 345/589 |
| 2015/0371124 A1* | 12/2015 | Okumura | | G06K 15/1878 358/1.9 |
| 2016/0232678 A1* | 8/2016 | Kurz | | G06F 30/00 |
| 2016/0248942 A1* | 8/2016 | Horita | | H04N 1/00045 |
| 2017/0365461 A1* | 12/2017 | Iwaki | | G01J 1/44 |
| 2018/0061307 A1* | 3/2018 | Inoue | | H01L 27/3211 |
| 2019/0197939 A1* | 6/2019 | Wang | | G09G 3/3685 |

FOREIGN PATENT DOCUMENTS

| | | |
|---|---|---|
| CN | 104620169 B | 5/2017 |
| CN | 106782428 A | 5/2017 |
| TW | 201616200 A | 5/2016 |

\* cited by examiner

METHOD FOR CALCULATING PIXEL VOLTAGE FOR LIQUID CRYSTAL ON SILICON DISPLAY DEVICE

BACKGROUND

Field of Invention

The present invention relates to a method for calculating a pixel voltage of a liquid crystal on silicon display device.

Description of Related Art

Nowadays, various kinds of projective display devices, such as liquid crystal display (LCD) display devices, digital light processing (DLP) display devices and liquid crystal on silicon (LCOS) display devices, are commercially available. Among these display devices, the LCD display devices operate in a transmissive way, while the DLP display devices and the LCOS display devices operate in a reflective way. LCD display devices are the oldest and the most popular, and have advantages such as high color accuracy and low manufacture cost. However, LCD display devices have disadvantages of dead pixels and screen door effect, which degrades display performance. DLP display devices have advantages such as high contrast ratio and immune to color decay. However, DLP display devices are relatively expensive. LCOS display devices involves techniques of the typical LCD panel and complementary metal-oxide semiconductor (CMOS) processes. LCOS display devices can achieve high resolution, high color saturation and accuracy and can be manufactured by semiconductor processes. With such advantages, LCOS display devices are applied in electronic devices such as micro-projectors, monitors or head mounted displays. However, sub-pixels in the LCOS display device are close to each other, and thus a fringing field effect may be generated. It is an issue to those skilled in the art about hot to address the fringing field effect.

SUMMARY

Embodiments of the invention provide a liquid crystal on silicon display device including a silicon substrate, a color filter layer, and a computation circuit. Multiple sub-pixels are formed on the silicon substrate, and each of the sub-pixels includes a pixel electrode and a common electrode. The color filter layer is disposed above the silicon substrate and includes multiple color filter units. Each of the color filter units corresponds one of the sub-pixels and is formed between the pixel electrode and the common electrode of the corresponding sub-pixel. The computation circuit obtains multiple grey levels of a pixel, and transforms the grey levels into multiple color values. The grey levels respectively correspond to multiple first sub-pixels of the sub-pixels, and the first sub-pixels constitute the pixel. For each of the first sub-pixels, the computation circuit obtains at least one parameter of a reflectance fitting function according to the color values, performs a gamma correction according to the corresponding grey level to obtain a reflectance, and calculates a pixel voltage according to the at least one parameter and the reflectance. The pixel voltage is applied to the pixel electrode of the corresponding first sub-pixel.

In some embodiments, the grey levels include a red value, a green value, and a blue value. The first sub-pixels include a red sub-pixel, a green sub-pixel, and a blue sub-pixel. The color values are in a CIE-1931 color space.

In some embodiments, the reflectance fitting function is written as the following equation (1).

$$Refl_c = A2 + \frac{A1 - A2}{1 + e^{(v_c - v_{0,c})/dv_c}} \tag{1}$$

$c$ denotes the green sub-pixel, the red sub-pixel, and the blue sub-pixel. $Refl_c$ denotes the reflectance of the corresponding first sub-pixel. $v_c$ denotes the pixel voltage of the corresponding first sub-pixel. A1 and A2 are constants, and the at least one parameter includes $v_{0,c}$ and $dv_c$.

In some embodiments, the gamma correction is written as the following equation (2).

$$Refl_c = \left(\frac{grey_c + 1}{C_{MAX} + 1}\right)^\gamma \tag{2}$$

$\gamma$ denotes a real number. $grey_c$ denotes the corresponding grey level. $C_{MAX}$ denotes a maximum grey level.

In some embodiments, the computation circuit inputs the color values into multiple lookup tables to obtain the parameters $v_{0,c}$ and $dv_c$, and calculates the pixel voltage $v_c$ according to the following equation (3).

$$v_c = dv_c \times \ln\left(\frac{A1 - A2}{\left(\frac{grey_c + 1}{C_{MAX} + 1}\right)^\gamma - A2} - 1\right) + v_{0,c} \tag{3}$$

In some embodiments, the reflectance fitting function is written as the following equation (4).

$$Refl_c = f(\overline{p_c}, v_c) \tag{4}$$

$\overline{p_c}$ denotes the at least one parameter with respect to the corresponding grey level.

In some embodiments, the gamma correction is written as an equation (5).

$$Refl_c = \left(\frac{grey_c}{C_{MAX}}\right)^\gamma \tag{5}$$

In some embodiments, the computation circuit inputs the color values into at least one lookup table to obtain the at least one parameter $\overline{p}$, and calculates the pixel voltage $v_c$ according to the following equation (6) where $f^{-1}(\ )$ is an inverse function of the reflectance fitting function.

$$v_c = f^{-1}(\overline{p_c}, Refl_c) \tag{6}$$

From another aspect, embodiments of the invention provide a method for calculating a pixel voltage for a liquid crystal on silicon display device. The liquid crystal on silicon display device includes a silicon substrate and a color filter layer. Multiple sub-pixels are formed on the silicon substrate, and each of the sub-pixels includes a pixel electrode and a common electrode. The color filter layer includes multiple color filter units, and each of the color filter units corresponds to one of the sub-pixels and is formed between the pixel electrode and the common electrode of the corresponding sub-pixel. The method includes: obtaining multiple grey levels of a pixel, and transforming the grey levels into multiple color values, in which the grey levels respectively corresponds to multiple first sub-pixels of the sub-pixel, and the first sub-pixels constitute the pixel; for each of the first sub-pixels, obtaining at least one parameter of a reflectance fitting function according to the color values, performing a gamma correction according to the corresponding grey level to obtain a reflectance, and calculating a pixel voltage according to the at least one parameter and the reflectance, in which the pixel voltage is applied to the pixel electrode of the corresponding first sub-pixel.

BRIEF DESCRIPTION OF THE DRAWINGS

The patent or application file contains at least one drawing executed in color. Copies of this patent or patent application publication with color drawing(s) will be provided by Office upon request and payment of the necessary fee. The disclosure can be more fully understood by reading the following detailed description of the embodiment, with reference made to the accompanying drawings as follows.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

The using of "first", "second", "third", etc. in the specification should be understood for identifying units or data described by the same terminology, but are not referred to particular order or sequence.

Figure 1A:
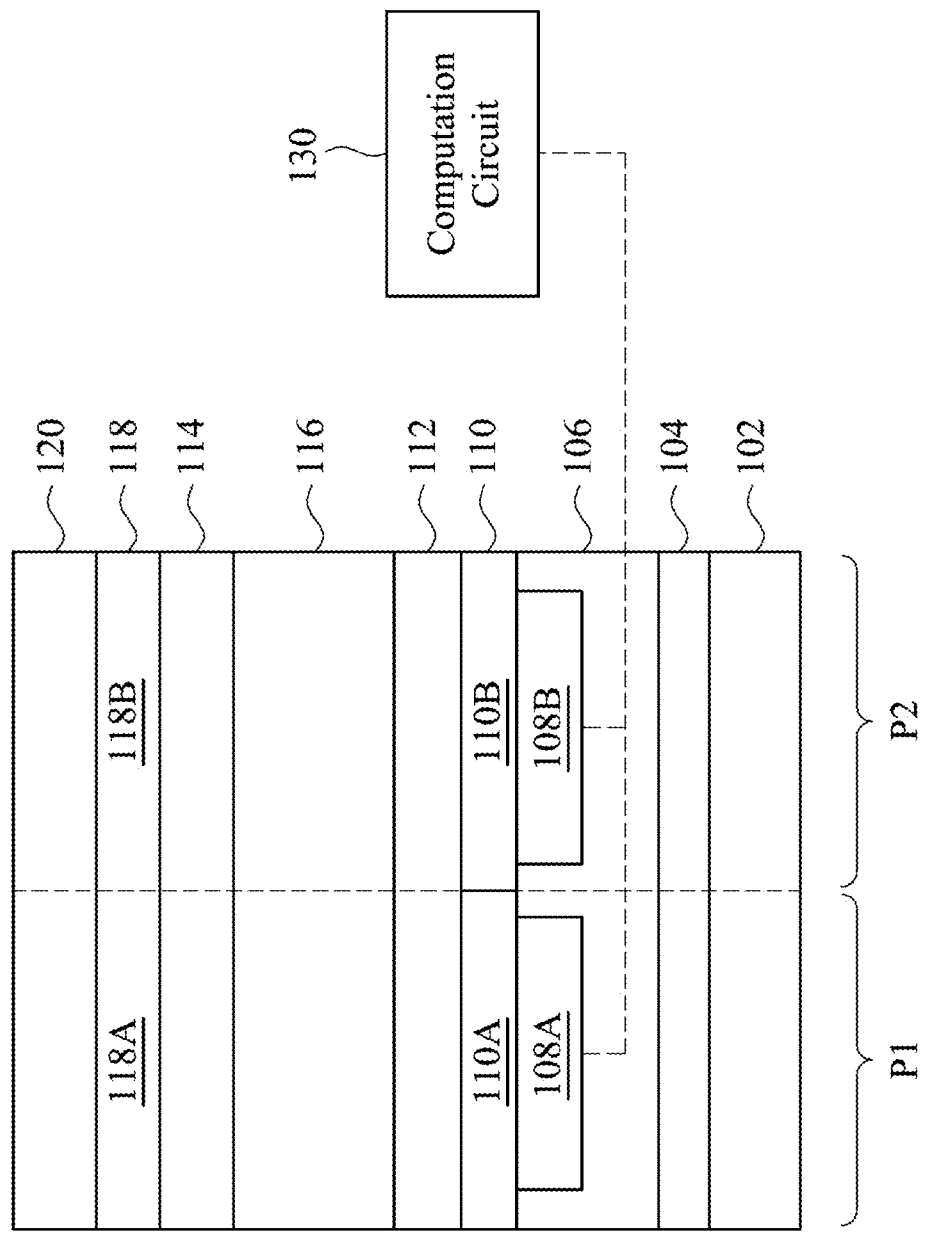
FIG. 1A is a local cross-sectional view of a LCOS display device 100 in accordance with an embodiment.

FIG. 1A is a local cross-sectional view of a LCOS display device 100 in accordance with an embodiment. The LCOS display device 100 includes a silicon substrate 102, a reflective layer 104, a dielectric layer 106, pixel electrodes 108A, 108B, a color filter layer 110, a first alignment layer 112, a second alignment layer 114, a liquid crystal layer 116, a common electrode layer 118, a transparent substrate 120, and a computation circuit 130.

Figure 1B:
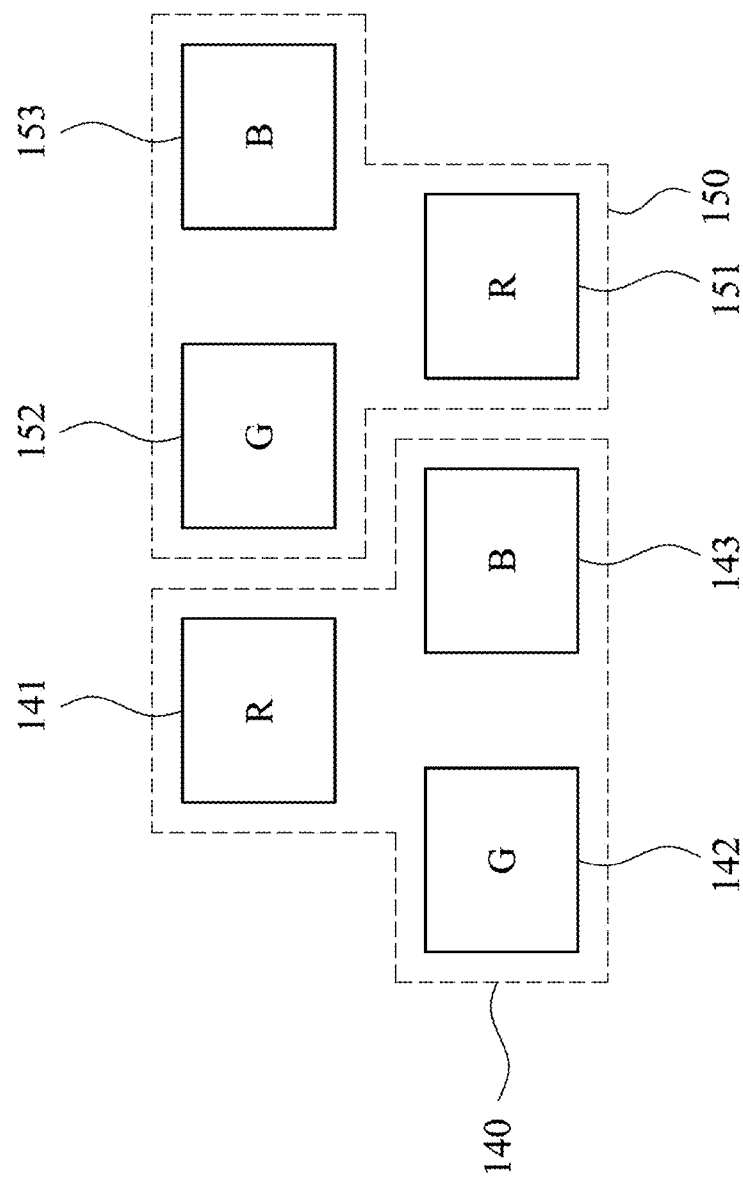
FIG. 1B is a local top view of the LCOS display device in accordance with an embodiment.

The silicon substrate 102 is a CMOS silicon wafer including active components such at transistors and circuits silicon substrate 102. Multiple sub-pixels are arranged on the silicon substrate 102, and these sub-pixels include red sub-pixels, blue sub-pixels and green sub-pixels. In some embodiments, every three sub-pixels (i.e. one red sub-pixel, one green sub-pixel and one blue sub-pixel) constitute one pixel. For example, FIG. 1B is a local top view of the LCOS display device in accordance with an embodiment. Referring to FIG. 1B, a pixel 140 includes sub-pixels 141-143 which correspond to red, green, and blue respectively; and a pixel 150 includes sub-pixels 151-153 which correspond to red, green and blue respectively. Note that only two sub-pixels P1 and P2 (e.g. the sub-pixels 141 and 142 of FIG. 1B) are illustrated in FIG. 1A for simplification, but the invention is not limited thereto. In addition, the red, green and blue sub-pixels may be arranged in another shape in other embodiments. In some embodiments, each pixel may further include a white pixel. The invention is not limited to the embodiment of FIG. 1B.

Referring to FIG. 1A, the reflective layer 104 is disposed on the silicon substrate 102. The reflective layer 104 reflects light incident into the LCOS display device 100. In some embodiments, the reflective layer 104 includes a metal material such as copper, aluminum, titanium, tantalum, nickel, gold, zinc, or a metal alloy containing the above metals, or a metal compound such as aluminum oxide, titanium oxide, titanium nitride, zinc oxide, or other suitable material. In some embodiments, the reflective layer 104 is a reflective film or a reflective coating formed on the silicon substrate 102.

The dielectric layer 106 is disposed on the reflective layer 104, and the pixel electrodes 108A, 108B are formed on the dielectric layer 106. The dielectric layer 106 is used for insulating the pixel electrodes 108A, 108B from the reflective layer 104 and the silicon substrate 102, penetrating a portion of incident light and penetrating reflected light from the reflective layer 104. The dielectric layer 106 includes a dielectric material, such as silicon oxide, silicon nitride, silicon oxynitride, combinations thereof, or other suitable material.

The pixel electrodes 108A, 108B are used for providing pixel voltages such that the pixels P1, P2 render respective gray levels. The pixel electrodes 108A, 108B may be reflective or transparent. In some embodiments, the pixel electrodes 108A, 108B are reflective electrodes including a material such as aluminum, titanium, copper, gold, or the like. In some embodiments, the pixel electrodes 108A, 108B are transparent electrodes including a material such as indium tin oxide (ITO), indium zinc oxide (IZO), or other suitable conductive material.

The color filter layer 110 is disposed on the pixel electrodes 108A, 108B. The color filter layer 110 has multiple color filter units 110A and 110B that respectively correspond to the sub-pixels for passing light with a particular color. For example, the color filter unit 110A corresponds to the sub-pixel P1 for passing red light; and the color filter unit 110B corresponds to the sub-pixel P2 for passing green light. In some embodiments, the color filter layer 110 includes a dyed or pigmented material such as polymer, or other suitable material.

The first alignment layer 112 is disposed on the color filter layer 110, and the second alignment layer 114 is disposed opposite to the first alignment layer 112, and the liquid crystal layer 116 is disposed between the first alignment layer 112 and the second alignment layer 114. The liquid crystal layer 116 has liquid crystal molecules aligned by the first alignment layer 112 and the second alignment layer 114 and twisted in response to an electric field generated between the pixel electrodes 108A, 108B and the common electrode layer 118. The first alignment layer 112 and the second alignment layer 114 may be formed to have respective rubbing directions. The liquid crystal molecules of the liquid crystal layer 116 may be configured for a vertical alignment (VA) display or a twisted nematic (TN) display, which is not limited in the invention.

The common electrode layer 118 includes a transparent and conductive material such as ITO, IZO, or other suitable material. In the embodiment, the common electrode layer 118 includes a common electrode 118A belonging to the sub-pixel P1 and a common electrode 118б belonging to the sub-pixel P2.

The transparent substrate 120 is disposed on the common electrode layer 118 for receiving incident light and protecting the internal components of the LCOS display device 100. In some embodiments, the transparent substrate 120 includes a transparent material such as glass, silicon dioxide, or the like.

Figure 2:
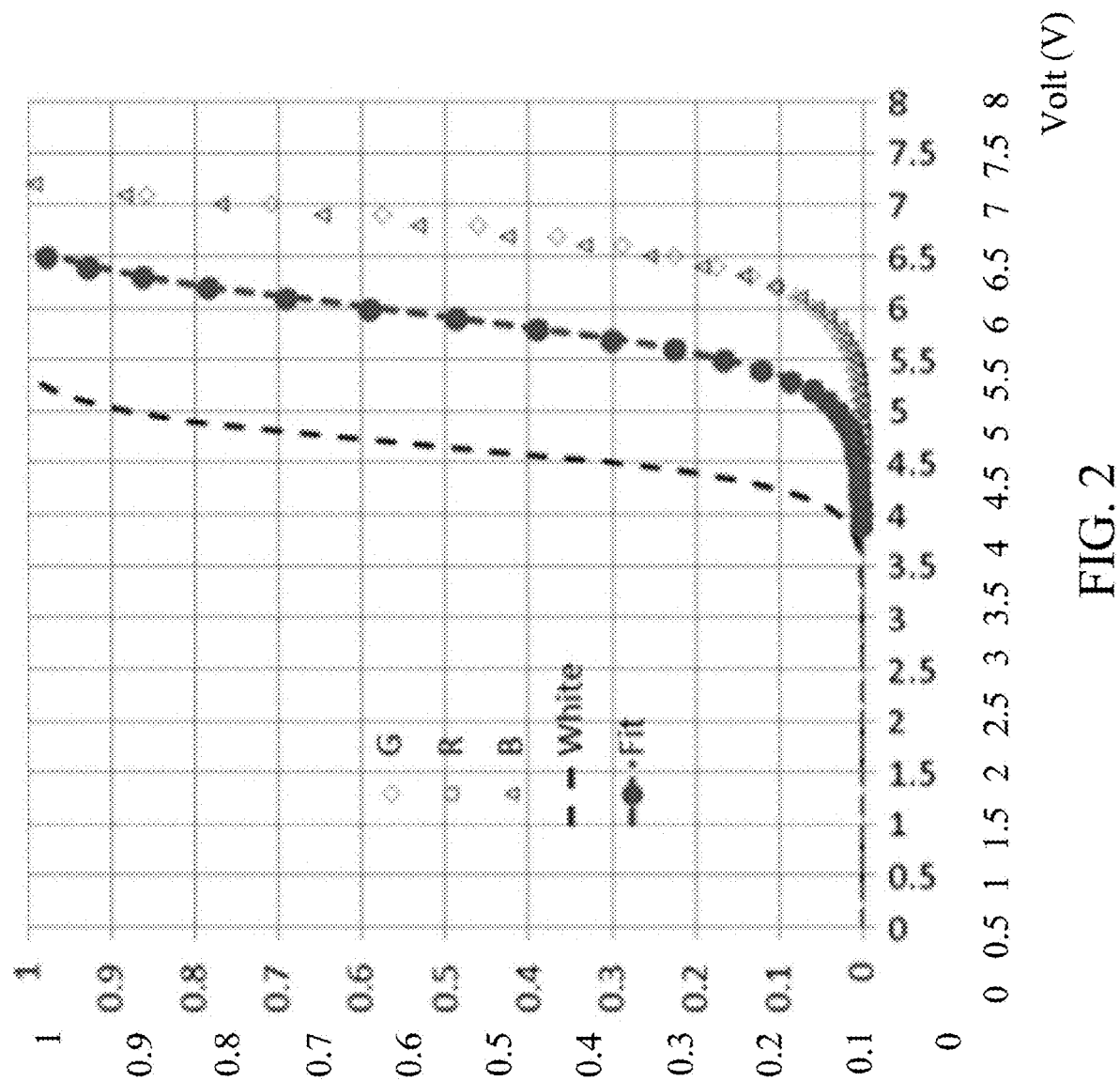
FIG. 2 is a curve diagram between reflectance and pixel voltage in accordance with an embodiment.

The computation circuit 130 calculates the pixel voltages for the pixel electrodes 108A, 108б. In general, a gamma correction is performed to calculate the pixel voltages. However, the electric field between the pixel electrode 108A and the common electrode 118A affects the sub-pixel P2, and the electric field between the pixel electrode 108B and the common electrode 118B also affects the sub-pixel P1. The electric field in each sub-pixel varies with respect to the color of the pixel to be rendered. In addition, the extent that the sub-pixels are affected also varies with respect to the material of the color filter units 110A and 110б. For example, the sub-pixel P1 may be affected by electric fields of the sub-pixel P2 with different magnitudes when different grey levels are to be rendered in the sub-pixel P2, and thus the sub-pixel P1 may have different reflectance even the same pixel voltage is applied to the sub-pixel P1. Referring to FIG. 2 which is a curve diagram between reflectance and pixel voltage in accordance with an embodiment in which the horizontal axis represents the pixel voltage and the vertical axis represents the reflectance. It is shown in FIG. 2 that curves of red, green, blue, and white sub-pixels (labeled as R, G, B, and White respectively) are not consistent for a particular color (the symbols for "R" curve overlaps with the Fit curve, and therefore may be seen in the figure). Accordingly, the pixel voltages of the sub-pixels cannot be calculated by the same gamma curve (e.g. the "Fit" curve). In addition, the curves of FIG. 2 may vary when different colors are rendered. In theory, every color and every sub-pixel needs a particular gamma curve to calculate the respective pixel voltage, but it is not practical due to a total of 16.7 million colors for a pixel of 24 bits. A method is provided herein to calculate the pixel voltages effectively.

First, a color is represented in the CIE-1931 color space in the embodiments, and thus three grey levels of red, green and blue are transformed into x and y stimulus. This step may be performed through a transformation matrix as written in the following equation (1).

$$\text{CIE}xy = tf \times \text{inputRGB} \tag{1}$$

inputRGB denotes a vector consisting of red, green and blue grey levels. CIExy denotes the x and y stimulus in the CIE-1931 color space. tf denotes the transformation matrix which is written as tf=[0.5767 0.1856 0.1882; 0.2974 0.6274 0.0753; 0.027 0.0707 0.9911] in some embodiments. However, other color spaces such as Munsell Color System and so on may be adopted to represent one color in other embodiments, and the therefore the transformed values are called color values for applying to a variety of color spaces. The values of the transformation matrix are not limited in the invention.

Next, the reflectance of a sub-pixel is measured for a set of x, y color values, and the applied pixel voltages are recorded. The reflectance is represented as $Refl_c$, where c=R, G or B. In other words, c denotes one of the red, green and blue sub-pixels. For example, $Refl_R$ is the reflectance of the red sub-pixel 141 of FIG. 1B; $Refl_G$ is the reflectance of the green sub-pixel 142; and $Refl_B$ is the reflectance of the blue sub-pixel 143. The relationship between the reflectance and the pixel voltage is approximated by a reflectance fitting function written in the following equation (2). In other words, the reflectance fitting function is used to approximate the curve shown in FIG. 2.

$$Refl_c = A2 + \frac{A1 - A2}{1 + e^{(v_c - v_{0,c})/dv_c}} \tag{2}$$

Figure 3:
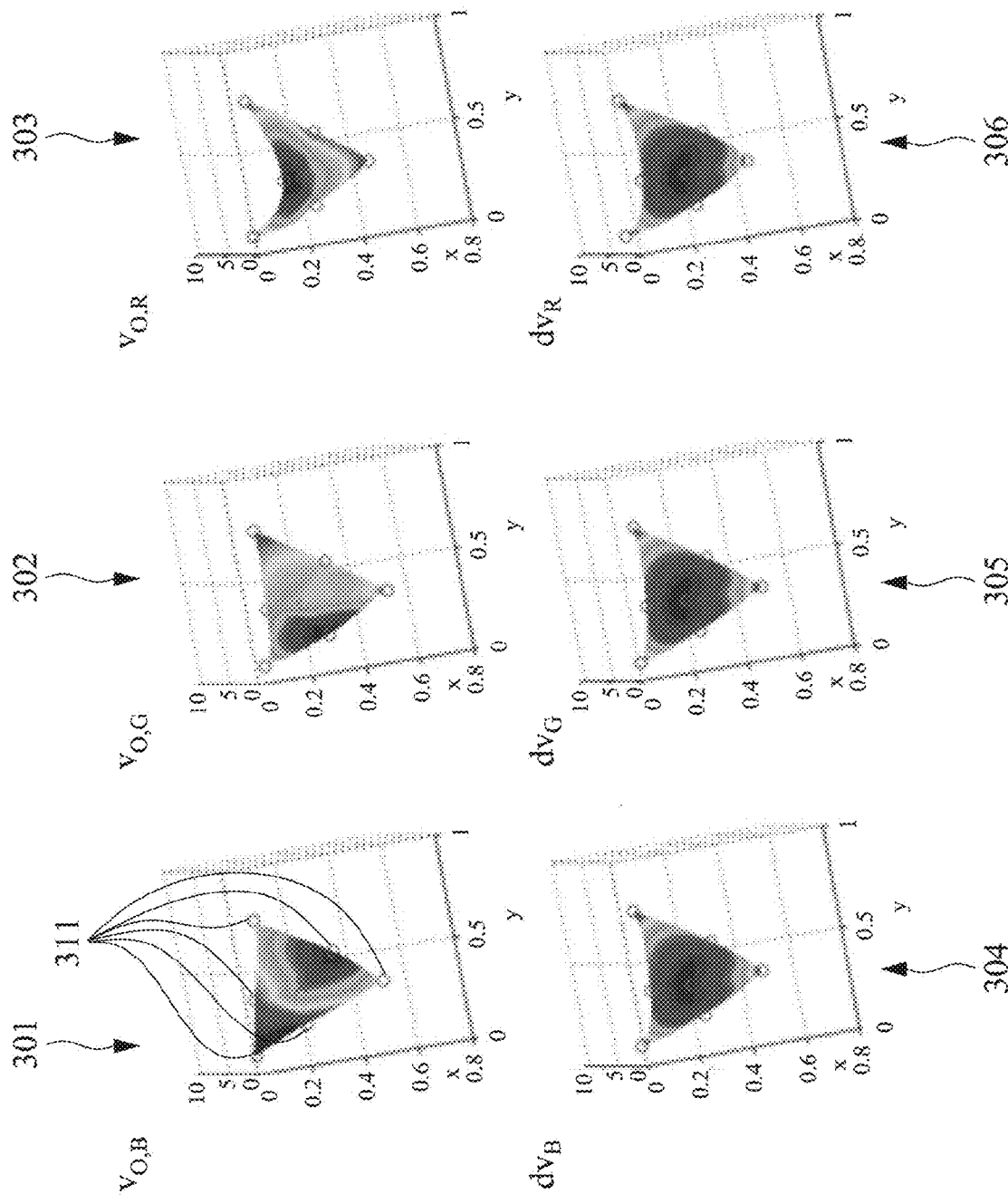
FIG. 3 illustrates diagrams for the relationship between the x, y color values and the parameters.

$v_c$ denotes the pixel voltage of the corresponding sub-pixel. For example, $v_R$ is the pixel voltage for the red sub-pixel 141, $v_G$ is the pixel voltage for the green sub-pixel 142, and $v_B$ is the pixel voltage for the blue sub-pixel 143. A1 and A2 are constant. $v_{0,c}$ and $dv_c$ are parameters. Note that different sets of x, y color values correspond to different parameters $v_{0,c}$, $dv_c$. There are infinite sets of x, y color values because the x, y color values are continuous. In the embodiment, the x, y color values are sampled as 16 sets, but not limited to, when measuring the reflectance $Refl_c$. Appropriates parameters $v_{0,c}$, $dv_c$ can be calculated for each set of x, y color values such that the reflectance $Refl_c$ calculated in the equation (2) approximates to the measured reflectance. Next, multiple lookup tables are created for mapping the x, y color values to the parameters $v_{0,c}$, $dv_c$. Referring to FIG. 3, a diagram 301 illustrates the relationship between the x, y color values and the parameter $v_{0,B}$; a diagram 302 illustrates the relationship between the x, y color values and the parameter $v_{0,G}$; a diagram 303 illustrates the relationship between the x, y color values and the parameter $v_{0,R}$; a diagram 304 illustrates the relationship between the x, y color values and the parameter $dv_B$; a diagram 305 illustrates the relationship between the x, y color values and the parameter $dv_G$; a diagram 306 illustrates the relationship between the x, y color values and the parameter $dv_R$. The diagrams 301-306 are implemented as lookup tables and recorded in a database which will be described below.

Furthermore, the reflectance that each sub-pixel should have is calculated according to the gamma correction written as the following equation (3).

$$Refl_c = \left(\frac{grey_c + 1}{C_{MAX} + 1}\right)^\gamma \tag{3}$$

γ denotes a real number which is determined based on the product or customer requirement. $grey_c$ denotes the corresponding grey level in a range of 0-255. For example, $grey_R$ is the red grey level when calculating the reflectance $Refl_R$ and so on. $C_{MAX}$ is a maximum grey level such as 255. Note that the equation (3) recites "$grey_c+1$" instead of "$grey_c$" to avoid dividing the grey level by zero. However, the following equation (4) may be adopted in other embodiments, which is not limited in the invention. In other embodiments, each grey level may have more bits than 8, and the range of each grey level and the maximum grey level are not limited in the invention.

$$Refl_c = \left(\frac{grey_c}{C_{MAX}}\right)^\gamma \tag{4}$$

Next, the equation (3) is substituted into the equation (2) to obtain the relationship between the pixel voltage $v_c$ and the reflectance $Refl_c$ as written in the following equation (5).

$$v_c = dv_c \times \ln\left(\frac{A1 - A2}{\left(\frac{grey_c + 1}{C_{MAX} + 1}\right)^\gamma - A2} - 1\right) + v_{0,c} \qquad (5)$$

Note that the following equation (6) is obtained if the equation (3) is replaced with the equation (4).

$$v_c = dv_c \times \ln\left(\frac{A1 - A2}{\left(\frac{grey_c}{C_{MAX}}\right)^\gamma - A2} - 1\right) + v_{0,c} \qquad (6)$$

Figure 4:
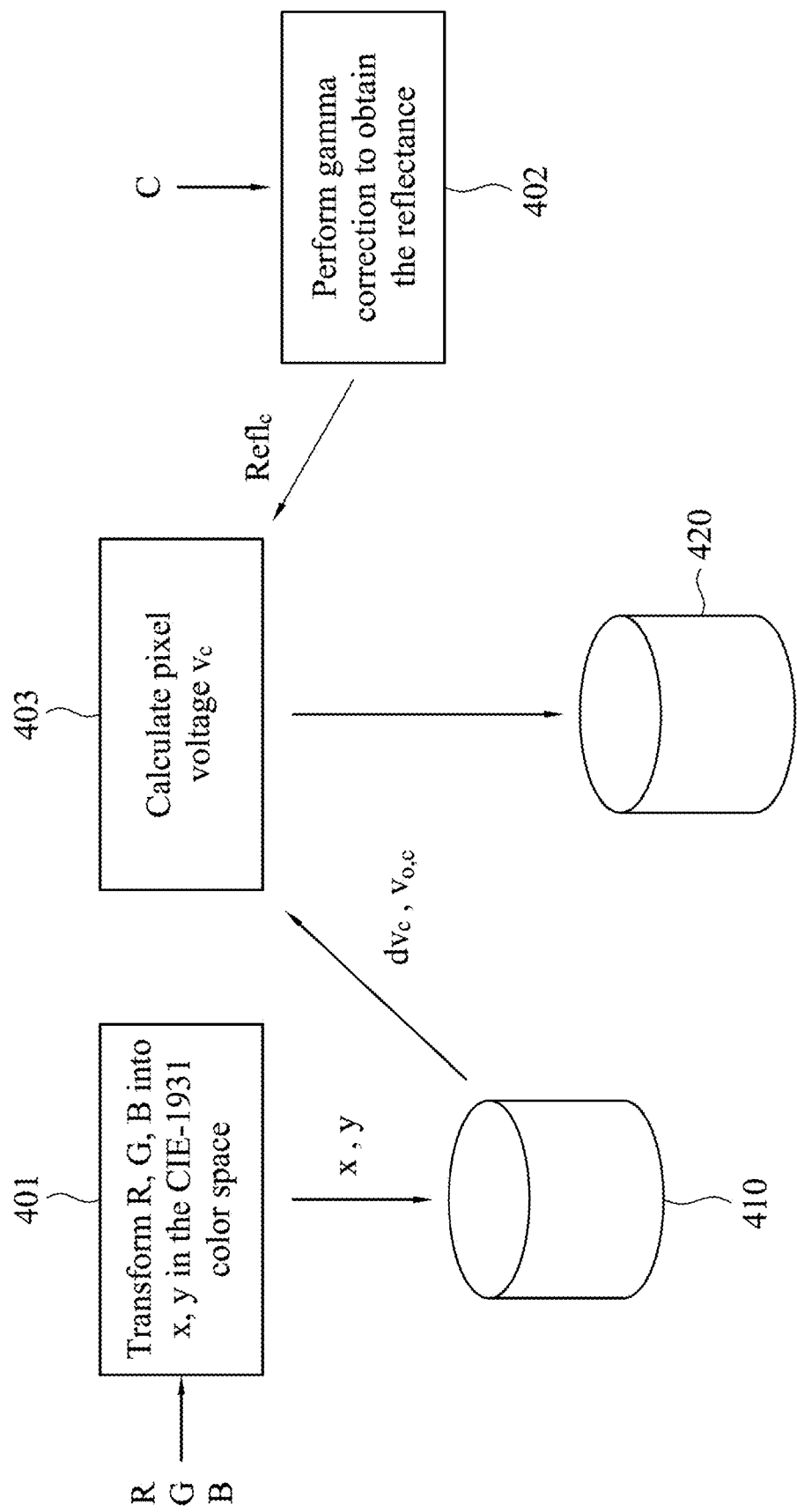
FIG. 4 is a schematic diagram of calculating the pixel voltage in accordance with an embodiment.

FIG. 4 is a schematic diagram of calculating the pixel voltage in accordance with an embodiment. Referring to FIG. 4, grey levels of a pixel are obtained that are represented as R, G, and B. In step 401, the grey levels are transformed into x, y color values in the CIE-1931 color space. Next, the x, y color values are inputted into lookup tables of a database 410 to obtain parameters $v_{0,c}$, $dv_c$ of a reflectance fitting function. The lookup tables were created based on the diagrams of FIG. 3. Since each lookup table only records finite sets of x, y color values, the parameters $v_{0,c}$, $dv_c$ may be calculated through interpolation. Take the diagram 301 of FIG. 3 as an example, all the parameters to be calculated are represented as a three-dimensional surface, and the sample points 311 on the surface are the parameters that are calculated according to the measured reflectance. The surface is divided into multiple triangles while the sample points 311 serve as the vertices of the triangles. When a set of x, y color values are inputted, a corresponding triangle is found, and the parameter on any point inside such triangle can be interpolated according to the parameters on the vertices of such triangle. Each diagram of FIG. 3 corresponds to a lookup table. In addition, in step 402, the gamma correction is performed to obtain the reflectance $Refl_c$, and that is, the aforementioned equation (3) or (4) is performed.

In step 403, a pixel voltage $v_c$ is calculated according to the parameters $v_{0,c}$, $dv_c$ and the reflectance $Refl_c$. In other words, the equation (5) or (6) is performed in the step 403. In some embodiments, the calculation within the ln function is done in real time, but the ln function itself is done by a lookup table. In other words, the calculation of the following equation (7) is done in real time, and the result of the equation (7) is inputted to a lookup table in a database 420 to obtain the output of the ln function.

$$\frac{A1 - A2}{\left(\frac{grey_c + 1}{C_{MAX} + 1}\right)^\gamma - A2} - 1 \qquad (7)$$

Therefore, the step 403 can be simplified as the following equations (8) and (9). Only a few calculations are needed to obtain the pixel voltage.

$$v_c = dv_c \times \alpha + v_{0,c} \qquad (8)$$

$$\alpha = \ln\left(\frac{A1 - A2}{\left(\frac{grey_c + 1}{C_{MAX} + 1}\right)^\gamma - A2} - 1\right) \qquad (9)$$

Figure 5:
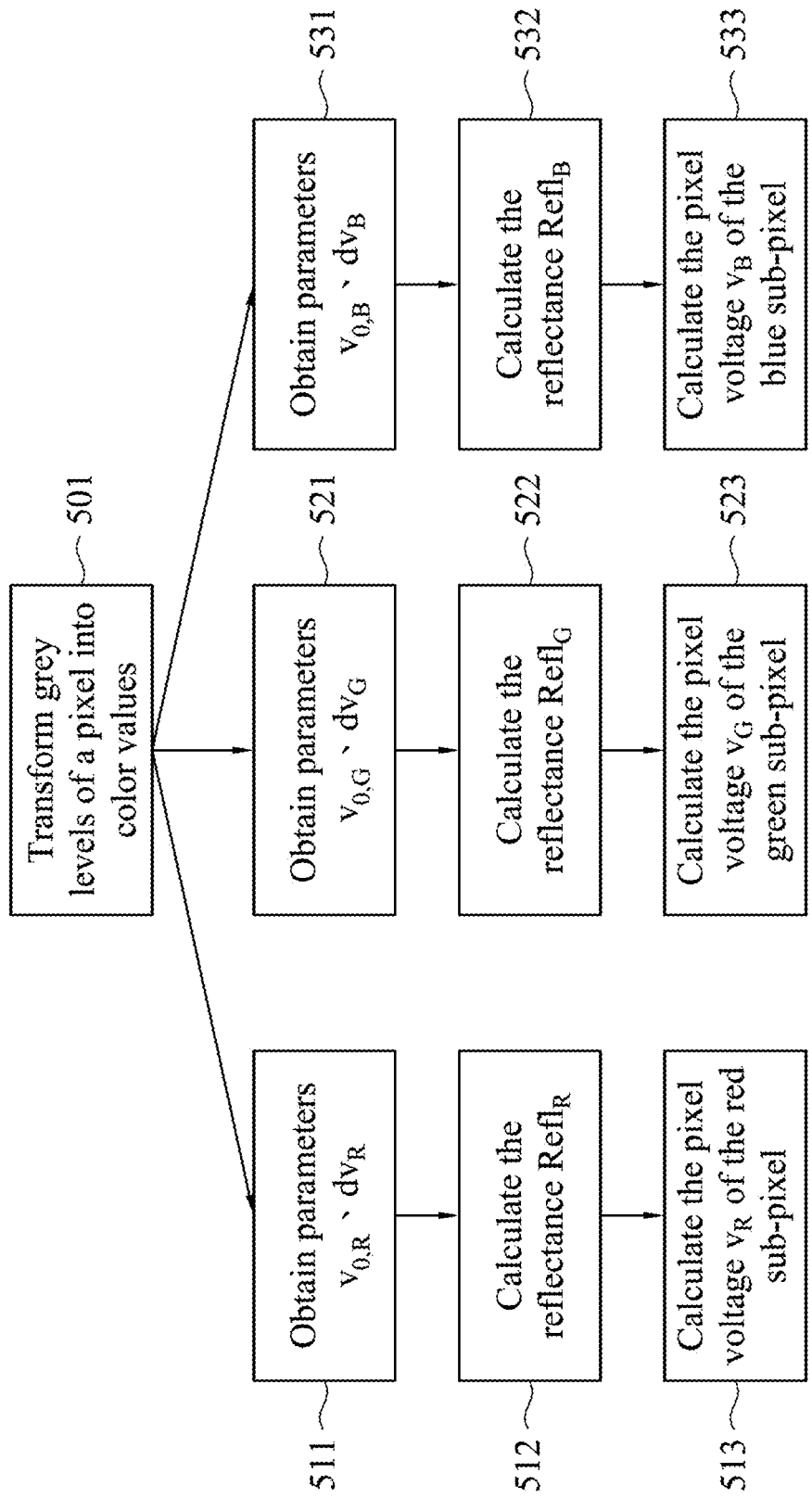
FIG. 5 is a flow chart of a method for calculating the pixel voltage in accordance with an embodiment.

Note that the pixel voltages of three sub-pixels are calculated separately. FIG. 5 is a flow chart of a method for calculating the pixel voltage in accordance with an embodiment. In step 501, multiple grey levels of a pixel are obtained, and the grey levels are transformed into color values in a color space such as the CIE-1931 color space. Next, steps 511-513 are applied to the red sub-pixel, the steps 521-523 are applied to the green sub-pixel, and the steps 531-533 are applied to the blue sub-pixel. In step 511, the parameters $v_{0,R}$, $dv_R$ are obtained according to the color values x, y. In step 512, the gamma correction is performed to calculate the reflectance $Refl_R$ of the red sub-pixel. In step 513, the pixel voltage $v_R$ of the red sub-pixel is calculated according to the parameters $v_{0,R}$, $dv_R$ and the reflectance $Refl_R$. The steps 521-523 are similar to the steps 511-513, but the parameters $v_{0,G}$, $dv_G$ are calculated in the 521, the reflectance $Refl_G$ is calculated in the step 522, and the pixel voltage $v_G$ is calculated in the step 523. Similarly, the parameters $v_{0,B}$, $dv_B$ are obtained in the step 531, the reflectance $Refl_B$ is calculated in the 532, and the pixel voltage $v_B$ is calculated in the step 533. In other words, different pixel voltages are calculated for different sub-pixels with respect to the same color.

Other reflectance fitting functions may be adopted in other embodiments, which are not limited in the invention. The reflectance fitting function may be written as a general form as the following equation (10).

$$Refl_c = f(\overline{p_c}, v_c) \qquad (10)$$

$\overline{p_c}$ denotes a vector with respect to c. The vector $\overline{p_c}$ includes at least one parameter such as the parameters $v_{0,c}$, $dv_c$ in the aforementioned embodiments. In the step 511, 521, and 531, the color value is inputted to at least one lookup table to obtain the parameter $\overline{p_c}$. In the steps 512, 522, and 532, the equation (3) or (4) is performed to obtain the reflectance $Refl_c$. In the steps 513, 523, and 533, the following equation (11) is performed to calculate the pixel voltage.

$$v_c = f^{-1}(\overline{p}, Refl_c) \qquad (11)$$

$f^{-1}( \ )$ is the inverse function of the reflectance fitting function. In other words, the equation (2) is a special case of the equation (10), and the equation (5) or (6) is a special case of the equation (11). In some embodiments, the reflectance fitting function includes a linear function, a polynomial function, an exponential function, a trigonometric function, a logarithmic function or a combination thereof, which is not limited in the invention. People in the art should be able to derive the inverse function after the reflectance fitting function is determined.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A liquid crystal on silicon display device, comprising:

a silicon substrate, wherein a plurality of sub-pixels are formed on the silicon substrate, and each of the sub-pixels comprises a pixel electrode, a common electrode, and a liquid crystal layer disposed between the pixel electrode and the common electrode;

a color filter layer disposed above the silicon substrate and comprising a plurality of color filter units, wherein each of the color filter units corresponds to one of the sub-pixels and is formed between the pixel electrode and the common electrode of the corresponding sub-pixel; and a computation circuit configured to obtain a plurality of grey levels of a pixel, and transform the grey levels into a plurality of color values, wherein the grey levels respectively correspond to a plurality of first sub-pixels of the sub-pixels, each of the first sub-pixels has different one of the color filter units, and the first sub-pixels constitute the pixel, wherein for each of the first sub-pixels, the computation circuit obtains at least one parameter of a reflectance fitting function according to the color values, performs a gamma correction according to the corresponding grey level to obtain a reflectance of the corresponding first sub-pixel, and calculates a pixel voltage according to the at least one parameter and the reflectance, wherein the pixel voltage is applied to the pixel electrode of the corresponding first sub-pixel, wherein the reflectance fitting function is written as an equation (1):

$$\text{Refl}_c = f(\overline{p}_c, v_c) \quad (1)$$

where c denotes one of the first sub-pixels, $\text{Refl}_c$ denotes the reflectance of the corresponding first sub-pixel, $v_c$ denotes the pixel voltage of the corresponding first sub-pixel, $\overline{p}_c$ denotes the at least one parameter with respect to the corresponding first sub-pixel.

2. The liquid crystal on silicon display device of claim 1, wherein the gamma correction is written as an equation (2):

$$\text{Refl}_c = \left(\frac{grey_c}{C_{MAX}}\right)^\gamma \quad (2)$$

γ denotes a real number, $grey_c$ denotes the corresponding grey level, and $C_{MAX}$ denotes a maximum grey level.

3. The liquid crystal on silicon display device of claim 2, wherein the computation circuit inputs the color values into at least one lookup table to obtain the at least one parameter and calculates the pixel voltage $v_c$ according to an equation (3):

$$v_c = f^{-1}(\overline{p}_c, \text{Refl}_c) \quad (3)$$

$f^{-1}(\ )$ is an inverse function of the reflectance fitting function.

4. The liquid crystal on silicon display device of claim 1, wherein the grey levels comprise a red value, a green value, and a blue value, the first sub-pixels comprise a red sub-pixel, a green sub-pixel, and a blue sub-pixel, and the color values are in a CIE-1931 color space.

5. The liquid crystal on silicon display device of claim 4, wherein the reflectance fitting function is written as an equation (2):

$$\text{Refl}_c = A2 + \frac{A1 - A2}{1 + e^{(v_c - v_{0,c})/dv_c}} \quad (2)$$

where c denotes the green sub-pixel, the red sub-pixel, or the blue sub-pixel, $\text{Refl}_c$ denotes the reflectance of the corresponding first sub-pixel, $v_c$ denotes the pixel voltage of the corresponding first sub-pixel, A1 and A2 are constants, and the at least one parameter comprises $v_{0,c}$ and $dv_c$.

6. The liquid crystal on silicon display device of claim 5, wherein the gamma correction is written as an equation (3):

$$\text{Refl}_c = \left(\frac{grey_c + 1}{C_{MAX} + 1}\right)^\gamma \quad (3)$$

γ denotes a real number, $grey_c$ denotes the corresponding grey level, and $C_{MAX}$ denotes a maximum grey level.

7. The liquid crystal on silicon display device of claim 6, wherein the computation circuit inputs the color values into a plurality of lookup tables to obtain the parameters $v_{0,c}$ and $dv_c$, and calculates the pixel voltage $v_c$ according to an equation (4):

$$v_c = dv_c \times \ln\left(\frac{A1 - A2}{\left(\frac{grey_c + 1}{C_{MAX} + 1}\right)^\gamma - A2} - 1\right) + v_{0,c}. \quad (4)$$

8. A method for calculating a pixel voltage for a liquid crystal on silicon display device comprising a silicon substrate and a color filter layer, wherein a plurality of sub-pixels are formed on the silicon substrate, each of the sub-pixels comprises a pixel electrode a common electrode, and a liquid crystal layer disposed between the pixel electrode and the common electrode, the color filter layer comprises a plurality of color filter units, each of the color filter units corresponds to one of the sub-pixels and is formed between the pixel electrode and the common electrode of the corresponding sub-pixel, and the method comprises:

obtaining a plurality of grey levels of a pixel, and transforming the grey levels into a plurality of color values, wherein the grey levels respectively corresponds to a plurality of first sub-pixels of the sub-pixels, each of the first sub-pixels has different one of the color filter units, and the first sub-pixels constitute the pixel;

for each of the first sub-pixels, obtaining at least one parameter of a reflectance fitting function according to the color values, performing a gamma correction according to the corresponding grey level to obtain a reflectance of the corresponding first sub-pixel, and calculating a pixel voltage according to the at least one parameter and the reflectance, wherein the pixel voltage is applied to the pixel electrode of the corresponding first sub-pixel, wherein the reflectance fitting function is written as an equation (1):

$$\text{Refl}_c = f(\bar{p}_c, v_c) \tag{1}$$

where c denotes one of the first sub-pixels, $\text{Refl}_c$ denotes the reflectance of the corresponding first sub-pixel, $v_c$ denotes the pixel voltage of the corresponding first sub-pixel, $\bar{p}_c$ denotes the at least one parameter with respect to the corresponding first sub-pixel.

* * * * *